United States Patent
Ren et al.

(10) Patent No.: US 8,702,992 B2
(45) Date of Patent: Apr. 22, 2014

(54) CONTINUOUS FLOW REACTOR AND METHOD OF USING THE SAME FOR TREATING NITROGEN AND PHOSPHORUS-CONTAINING WASTEWATER

(75) Inventors: Hongqiang Ren, Nanjing (CN); Qiucheng Li, Nanjing (CN); Tao Zhang, Nanjing (CN); Lili Ding, Nanjing (CN); Ke Xu, Nanjing (CN); Xinkun Ren, Nanjing (CN)

(73) Assignee: Nanjing University, Nanjing (CN)

( * ) Notice: Subject to any disclaimer, the term of this patent is extended or adjusted under 35 U.S.C. 154(b) by 0 days.

(21) Appl. No.: 13/459,341

(22) Filed: Apr. 30, 2012

(65) Prior Publication Data
US 2012/0211433 A1 Aug. 23, 2012

Related U.S. Application Data
(63) Continuation-in-part of application No. PCT/CN2010/080292, filed on Dec. 27, 2010.

(30) Foreign Application Priority Data
Aug. 17, 2010 (CN) .......................... 2010 1 0254867

(51) Int. Cl.
| | | |
|---|---|---|
| *B01D 21/01* | (2006.01) | |
| *B03D 3/00* | (2006.01) | |
| *C02F 1/52* | (2006.01) | |
| *C02F 1/68* | (2006.01) | |
| *C02F 1/76* | (2006.01) | |
| *C02F 1/00* | (2006.01) | |
| *B01D 15/00* | (2006.01) | |
| *B01J 20/00* | (2006.01) | |
| *B01D 35/00* | (2006.01) | |
| *B01D 24/00* | (2006.01) | |
| *B01D 29/00* | (2006.01) | |
| *B01D 33/00* | (2006.01) | |

(52) U.S. Cl.
USPC ........... 210/723; 210/724; 210/712; 210/726; 210/738; 210/749; 210/752; 210/743; 210/198.1; 210/205; 210/208

(58) Field of Classification Search
None
See application file for complete search history.

(56) References Cited

U.S. PATENT DOCUMENTS

| | | | |
|---|---|---|---|
| 2003/0196965 A1* | 10/2003 | Haggerty ....................... | 210/718 |
| 2004/0187770 A1* | 9/2004 | Calabrese et al. ............ | 117/200 |
| 2007/0000841 A1* | 1/2007 | Harrington et al. .......... | 210/703 |
| 2008/0257826 A1* | 10/2008 | Koch et al. .................... | 210/709 |

OTHER PUBLICATIONS

Uludag-Demirer, et al. "Ammonia removal from anaerobically digested dairy manure by struvite precipitation", Process Biochemistry, 2005, 40, 3667-3674, Elsevier Ltd.*
Lee, et al. "Removal of nitrogen and phosphate from wastewater by addition of bittern", Chemosphere, 2003, 51, 265-271, Elsevier Science Ltd.*

* cited by examiner

*Primary Examiner* — Nam Nguyen
*Assistant Examiner* — Clare Perrin
(74) *Attorney, Agent, or Firm* — Matthias Scholl P.C.; Matthias Scholl

(57) ABSTRACT

A continuous flow reactor, including a cylindrical coagulation crystallizer, a funnel type protective baffle for static settling, and a conical static settler. A lower end surface of the cylindrical coagulation crystallizer is connected with an upper end surface of the conical static settler, and the funnel type protective baffle for static settling is connected with an inner wall of the cylindrical coagulation crystallizer.

20 Claims, 2 Drawing Sheets

CONTINUOUS FLOW REACTOR AND METHOD OF USING THE SAME FOR TREATING NITROGEN AND PHOSPHORUS-CONTAINING WASTEWATER

CROSS-REFERENCE TO RELATED APPLICATIONS

This application is a continuation-in-part of International Patent Application No. PCT/CN2010/080292 with an international filing date of Dec. 27, 2010, designating the United States, now pending, and further claims priority benefits to Chinese Patent Application No. 201010254867.1 filed Aug. 17, 2010. The contents of all of the aforementioned applications, including any intervening amendments thereto, are incorporated herein by reference.

BACKGROUND OF THE INVENTION

The invention relates to a device and a method for treating nitrogen and phosphorus wastewater, and more particularly to a continuous flow reactor for recycling nitrogen and phosphorus from wastewater based on the crystallization principle of magnesium ammonium phosphate, and a method using the same for treating wastewater.

DESCRIPTION OF THE RELATED ART

Most nitrogen and phosphorus in industrial and domestic sewage exist in the form of $NH_4^+$ and $PO_4^{3-}$, which provides technical conditions for recycling nitrogen and phosphorus by crystallization of magnesium ammonium phosphate (MAP). When a magnesium source is added to high-concentration nitrogen and phosphorus wastewater, the following reaction will occur: $Mg^{2+}+NH_4^++PO_4^{3-}+6H_2O=MgNH_4PO_4.6H_2O$. MAP is a crystal poorly soluble in water, contains two nutrient elements of nitrogen and phosphorus, and is a good slow-release fertilizer. MAP has the advantages of low heavy metal content, long release period, high plant absorption efficiency, low cost investment, and no secondary pollution to the environment relative to the currently used urea and other fertilizers. The method of recycling nitrogen and phosphorus by crystallization of magnesium ammonium phosphate (MAP) has been widely used in Japan, North America, Europe and other places at present, and good treatment effect has been achieved. The anaerobic-digested effluent in waste liquor from a milk factory, coking wastewater, landfill leachate, and livestock wastewater are treated by adopting a fluidized bed reactor or spherical reactor, together with the MAP crystallization and precipitation method, and the recovery ratio of nitrogen and phosphorus is generally higher than 80%. Studies show that the optimal pH value in the recovery of nitrogen and phosphorus by the MAP crystallization and precipitation method ranges from 9.0 to 10.7, and when the molar ratio among the actual substances of all components for precipitating MAP is controlled according to the following relationship: $n(Mg^{2+}):n(NH_4^+):n(PO_4^{3-})=1.2-1.4:1:0.8-1$, the ratio of removing nitrogen and phosphorus is optimal. Therefore, the dosage and variety of Mg salt are the key factors for formation of magnesium ammonium phosphate (MAP) precipitation, and the selection of precipitants should be closely related to the specific purposes of removing and recycling nitrogen or/and phosphorus in the practical work.

All industrial wastewater faces the technical problems of high pollutant concentration, large quantity of emission, difficulty in treatment, etc. Conventional reactors for removing and recycling nitrogen and phosphorus using MAP crystallization and precipitation method are "top-in and bottom-out" or "bottom-in and top-out" sequencing batch fluidized beds. The design method has the disadvantages of complex process, low wastewater treatment capacity, great turbulence influence to the reactor, difficulty in obtaining high recovery ratio of nitrogen and phosphorus at the same time, difficult slag-water separation, low recycling purity of MAP and the like. To solve the problems, a continuous flow reactor, with coagulation of water inflow at the upper end, sludge discharged by static settling at the lower end, a baffle additionally arranged in the middle and water outflow at an opening on the lower edge of the baffle plate, is developed. The wastewater treatment capacity is improved in the reactor. However, the generated MAP crystal is easily scaled at the outlet after the reactor runs a period of time. Thus, the water outlet effect is affected, the reaction effect is still not ideal due to various adverse factors of high flow rate of wastewater, more turbulence, etc., and the concentrations of nutrient and phosphorus from the treated wastewater are lower than 200 mg/L.

SUMMARY OF THE INVENTION

In view of the above-described problems, it is one objective of the invention to provide a continuous flow reactor for treatment of high-concentration nitrogen and phosphorus wastewater, and a method using the same for treating wastewater, so that the high-concentration nitrogen and phosphorus wastewater can be stably treated.

To achieve the above objective, in accordance with one embodiment of the invention, there is provided a continuous flow reactor for treating high-concentration nitrogen and phosphorus wastewater, comprising a cylindrical coagulation crystallizer, a funnel type protective baffle for static settling, and a conical static settler; wherein a lower end surface of the cylindrical coagulation crystallizer is connected with an upper end surface of the conical static settler, and the funnel type protective baffle for static settling is connected with an inner wall of the cylindrical coagulation crystallizer.

In a class of this embodiment, the continuous flow reactor further comprises an inclined plate settling zone; a wall-attached inclined plate settler is arranged in the inclined plate settling zone, a side surface of the wall-attached inclined plate settler is connected with an outer side surface of the cylindrical coagulation crystallizer, and a small opening with a rectangular mapping surface is formed at a lower part of the cylindrical coagulation crystallizer and communicated with the wall-attached inclined plate settler.

In a class of this embodiment, a cylindrical influent protector with a sawtooth slot is installed at an upper part of the cylindrical coagulation crystallizer, and a lower part of the cylindrical influent protector with the sawtooth slot is connected with the upper part of the cylindrical coagulation crystallizer.

In a class of this embodiment, a wall-attached effluent protector with a sawtooth slot is installed at an upper part of the wall-attached inclined plate settler, a side surface of the wall-attached effluent protector with the sawtooth slot is connected with an outer side surface of the cylindrical coagulation crystallizer, and an upper part of the wall-attached inclined plate settler is connected with a lower part of the wall-attached effluent protector with the sawtooth slot.

After the cylindrical influent protector with the sawtooth slot is installed in the reactor, a feed opening of the cylindrical coagulation crystallizer is protected, so as to effectively avoid the overflow accident due to the excessive water inflow capacity or the blocked outlet at the lower part of the cylindrical coagulation crystallizer and other unexpected circumstances.

After the wall-attached effluent protector with the sawtooth slot is installed in the reactor, the magnesium ammonium phosphate crystal is effectively intercepted, the turbidity of effluent is lowered, the settling separation effect of the wall-attached inclined plate settler is enhanced, and the removal and recovery ratio of nitrogen and phosphorus is increased.

The overall performance of the cylindrical coagulation crystallizer is markedly superior to that of a square reactor, a cuboid-shaped reactor, or other reactors in other shapes, so that the agitation effect in coagulation is favorably enhanced, various interferences of the turbulence and dead angle inside the reactor to the reaction process are effectively avoided, the reaction liquid is fully mixed and reacts, and the recovery ratio of nitrogen and phosphorus is greatly increased.

In a class of this embodiment, a water inlet pipe, a magnesium source feed pipe, a mechanical agitator or an aeration pipe, a dynamic pH monitor, and a pH regulator solution feed pipe are arranged in the cylindrical coagulation crystallizer. A precipitation crystal outlet is formed at the bottom of the conical static settler, the transverse cross section of the precipitation crystal outlet is circular, and a valve is installed for controlling.

The ratio of height to diameter of the cylindrical coagulation crystallizer of the reactor is 4:1-2:1; the distance from the joint between the funnel type protective baffle for static settling and the cylindrical coagulation crystallizer to the bottom of the cylindrical coagulation crystallizer is ¼-⅓ of height of the cylindrical coagulation crystallizer; the height of the wall-attached inclined plate settler is ¾-⅘ of that of the cylindrical coagulation crystallizer, and an acute angle formed between an inclined plate of the wall-attached inclined plate settler and a wall surface of the cylindrical coagulation crystallizer is 20°-40°; and an acute angle formed between the funnel type protective baffle for static settling and the wall surface of the cylindrical coagulation crystallizer is 60°-80°.

A method for treating high-concentration nitrogen and phosphorus wastewater using a continuous flow reactor, comprising:

1. starting stage of the reactor: after the mol ratio of $NH_4^+$—N and $PO_4^{3-}$—P is adjusted to 1-20:1, introducing wastewater comprising $NH_4^+$—N and $PO_4^{3-}$—P into the cylindrical coagulation crystallizer, adjusting a water-intake peristaltic pump to ensure the water inflow at 0.5-3 L/h after the sewage accounts for ⅘-⅚ of volume of the cylindrical coagulation crystallizer, opening a mechanical agitator or introducing air into an aeration pipe (When mechanical agitation is selected, the rotational speed of the mechanical agitator is 30-150 rpm; when aerated stirring is selected, the volume ratio between the air intake quantity and the liquid intake quantity is 5-20:1), adding a magnesium source to the cylindrical coagulation crystallizer, adjusting the concentration of a $Mg^{2+}$-containing solution and the flow rate of a feed pipe so that the mol ratio of $Mg^{2+}$ and $NH_4^+$ in the influent in the reactor is 1-5:1, and opening a pH regulator solution feed pipe to ensure the pH value of the reaction liquid to remain 7-10; and 2. stabilization stage of the reactor: reflowing initial effluent in the reactor for secondary treatment, and introducing the effluent to a next processing unit for further treatment when the removal ratio of nitrogen and phosphorus in the effluent in the reactor reaches 95% or above and maintain stable. A valve at the bottom of the conical static settler is opened at fixed time to discharge the MAP crystal obtained by coagulation crystallization.

In a class of this embodiment, the pH regulator solution is HCl solution (acid liquor) or NaOH solution (alkaline liquor). The magnesium source is $MgSO_4$, $MgCl$, $MgO$, or a mixture thereof.

Advantages of the invention are summarized below:
(1) The invention provides a continuous flow reactor for stably treating wastewater containing nitrogen and phosphorus, and a method using the same for treatment of wastewater. The method simplifies the process flow, increases the treatment capacity of wastewater in unit time, shortens the treatment time, and saves the treatment cost.
(2) The wastewater in the invention is treated with a "top-in and top-out" U-shaped flow treatment way, that is, the reactor gets water from the top and drains water from the top. The contact time of reactants is increased, so that the reaction is more thorough, the crystallization sedimentation of nitrogen, phosphorus, and magnesium in the reaction liquid is enhanced, and the efficiency of recycling nitrogen and phosphorus by MAP crystallization is improved.
(3) Conventional series flow of "coagulation-precipitation" is separated by establishing three relatively independent reaction devices: the cylindrical coagulation crystallizer, the conical static settler, and the wall-attached inclined plate settler; the funnel type protective baffle for static settling is additionally arranged, the negative impact generated by turbulent motion of liquid in the reactor can be greatly reduced by adopting the reactor structure, the process of coagulation and precipitation does not interfere with each other, the precipitation effect of MAP crystals is good, the residual MAP crystal carried in the effluent is less, and the water quality is more ideal.
(4) The effect of treating high-concentration nitrogen and phosphorus wastewater is ideal. Under the same operating conditions, when the concentration of $NH_4^+$—N is higher than 500 mg/L, and the concentration of $PO_4^{3-}$—P is higher than 1000 mg/L, the removal and recovery ratio of nitrogen and phosphorus is 95% or above, the concentrations of nitrogen and phosphorus of the final effluent are reduced, and the recovery ratio is effectively improved.
(5) The pH regulator solution is added in the reaction process to remain the stable pH value in the reaction liquid, so that the optimal crystallization process of MAP is realized, the MAP precipitation capacity is remarkably improved, and the purity of the product is ensured.

Figure 1:
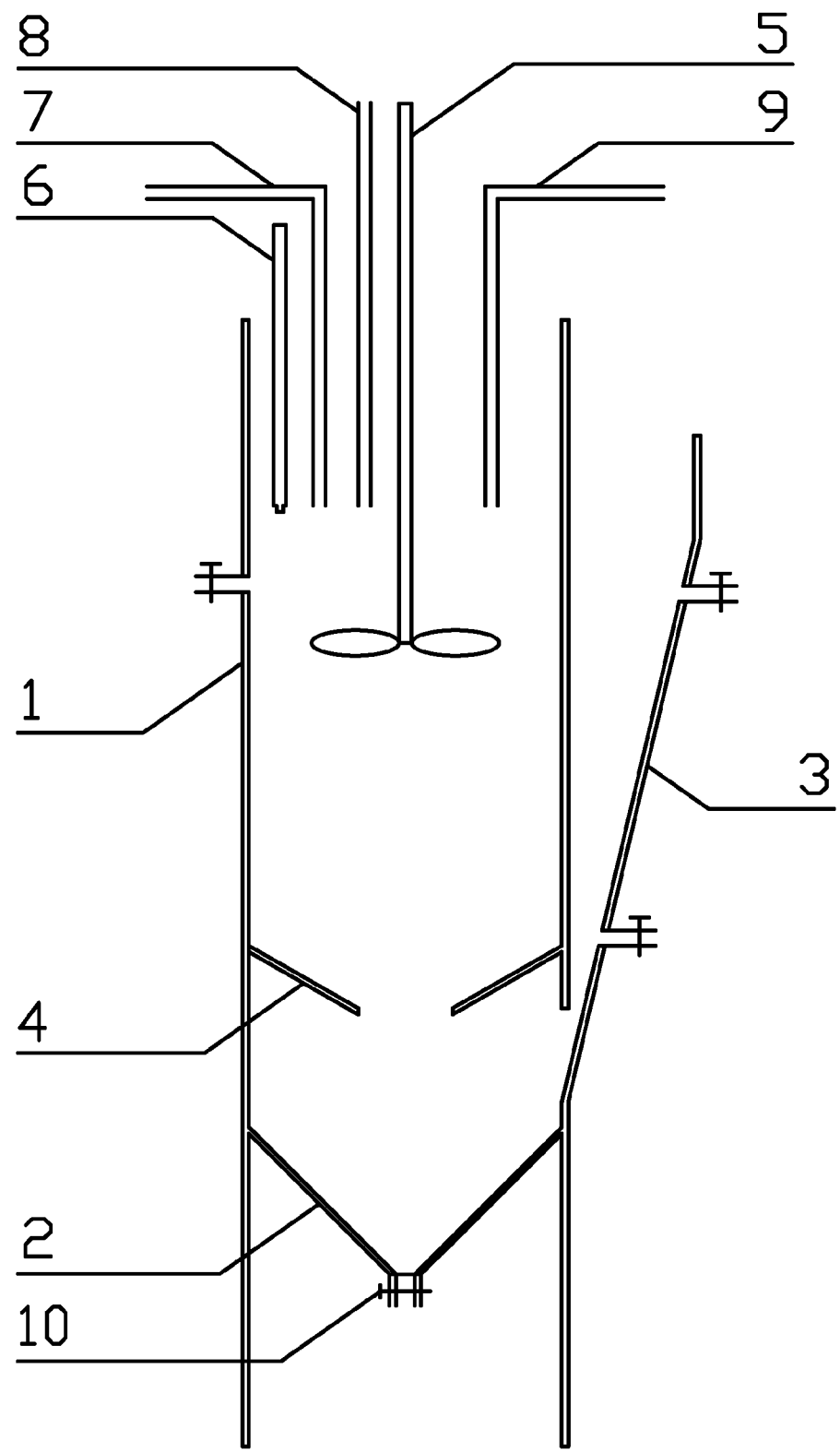
FIG. 1 is a structural diagram of a continuous flow reactor in accordance with one embodiment of the invention.

In the drawings, the following reference numbers are used: cylindrical coagulation crystallizer 1, conical static settler 2, wall-attached inclined plate settler 3, funnel type protective baffle for static settling 4, mechanical agitator 5, pH monitor 6, water inlet pipe 7, magnesium source feed pipe 8, pH regulator solution feed pipe 9, MAP crystal discharge valve 10, cylindrical influent protector 11 with a sawtooth slot, wall-attached effluent protector 12 with a sawtooth slot.

DETAILED DESCRIPTION OF THE EMBODIMENTS

Example 1

Figure 2:
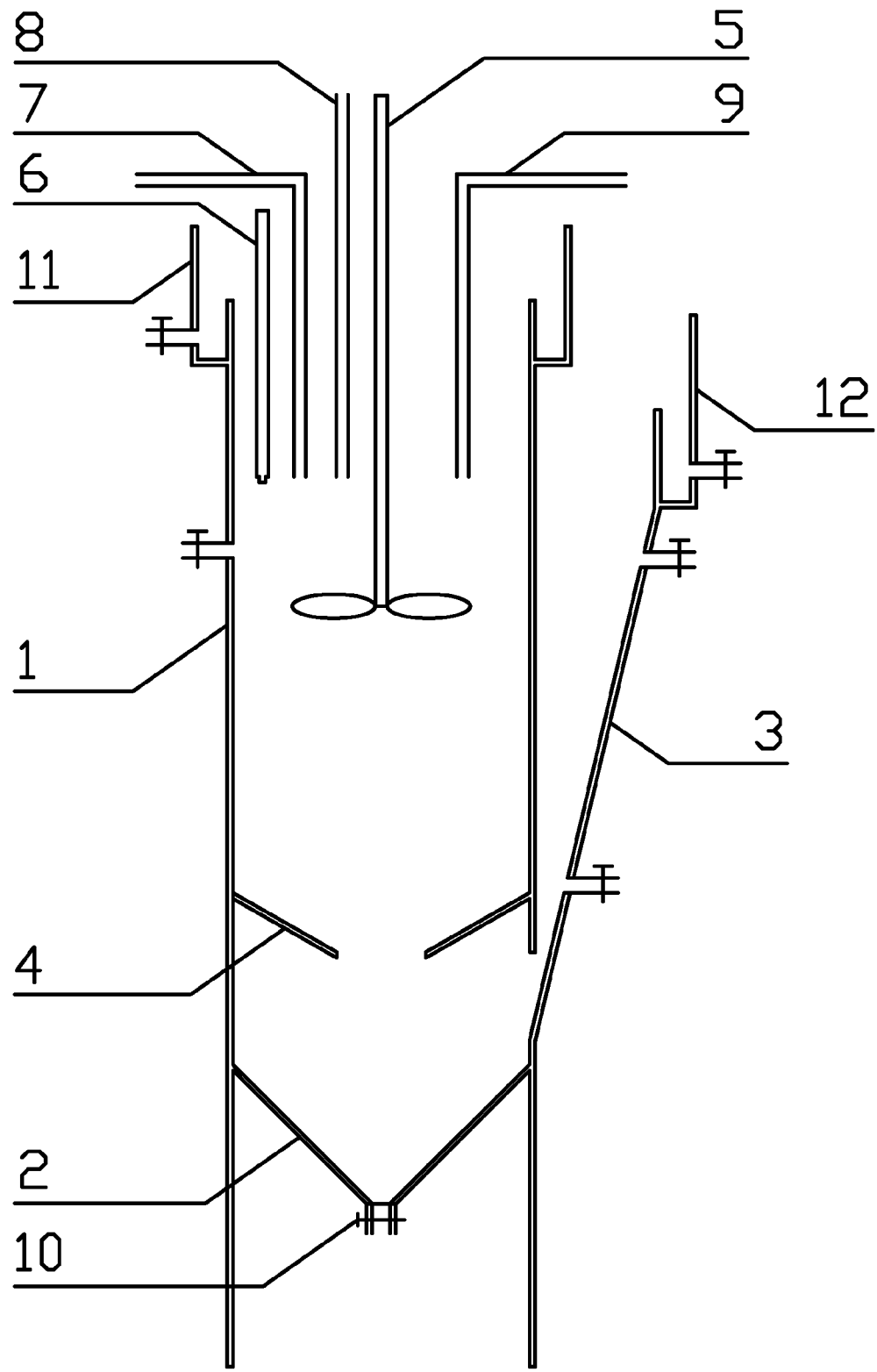
FIG. 2 is another structural diagram of a continuous flow reactor in accordance with one embodiment of the invention.

As shown in FIG. 2, a continues flow reactor for recycling high-concentration nitrogen and phosphorus wastewater by adopting the magnesium ammonium phosphate crystallization technology comprises a cylindrical coagulation crystallizer 1, a conical static settler 2, a wall-attached inclined plate settler 3, a funnel type protective baffle for static settling 4, a mechanical agitator 5, a dynamic pH monitor 6, a water inlet pipe 7, a magnesium source feed pipe 8, a pH regulator solution feed pipe 9, an MAP crystal discharge valve 10, a cylindrical influent protector 11 with a sawtooth slot, and a wall-attached effluent protector 12 with a sawtooth slot. The lower part of the cylindrical influent protector 11 with the sawtooth slot is connected with the upper part of the cylindrical coagulation crystallizer 1. The lower end surface of the cylindrical coagulation crystallizer 1 is connected with the upper end surface of the conical static settler 2. The funnel type protective baffle for static settling 4 is connected with the inner wall of the cylindrical coagulation crystallizer 1. The side surface of the wall-attached inclined plate settler 3 is connected with the outer side surface of the cylindrical coagulation crystallizer 1. A small opening with a rectangular mapping surface is formed at the lower part of the cylindrical coagulation crystallizer 1 and communicated with the wall-attached inclined plate settler 3. The side surface of the wall-attached effluent protector 12 with the sawtooth slot is connected with the outer side surface of the cylindrical coagulation crystallizer 1, and the upper part of the wall-attached inclined plate settler 3 is connected with the lower part of the wall-attached effluent protector 12 with the sawtooth slot. The water inlet pipe 7, the magnesium source feed pipe 8, the mechanical agitator 5 or aeration pipe, the dynamic pH monitor 6, and the pH regulator solution feed pipe 9 are arranged in the cylindrical coagulation crystallizer 1. A precipitation crystal outlet is formed at the bottom of the conical static settler 2. The transverse cross section of the precipitation crystal outlet is circular, and a valve 10 is installed for controlling. The overall volume of the reactor is 2.0 L, the ratio of height to diameter of the cylindrical coagulation crystallizer 1 is 2:1, and the distance from the joint between the funnel type protective baffle for static settling 4 and the cylindrical coagulation crystallizer 1 to the bottom of the cylindrical coagulation crystallizer 1 is ¼ of height of the cylindrical coagulation crystallizer 1; the height of the wall-attached inclined plate settler 3 is ⅘ of that of the cylindrical coagulation crystallizer 1, and an acute angle formed between an inclined plate of the wall-attached inclined plate settler 3 and the wall surface of the cylindrical coagulation crystallizer 1 is 25°; an acute angle formed between the funnel type protective baffle for static settling 4 and the wall surface of the cylindrical coagulation crystallizer 1 is 60°.

Example 2

As shown in FIG. 2, a continues flow reactor for recycling high-concentration nitrogen and phosphorus wastewater is the same as that in Example 1 except that the overall volume of the reactor is 2.5 L, the ratio of height to diameter of the cylindrical coagulation crystallizer 1 is 3:1, and the distance from the joint between the funnel type protective baffle for static settling 4 and the cylindrical coagulation crystallizer 1 to the bottom of the cylindrical coagulation crystallizer 1 is ⅓ of height of the cylindrical coagulation crystallizer 1; the height of the wall-attached inclined plate settler 3 is ¾ of that of the cylindrical coagulation crystallizer 1, and an acute angle formed between an inclined plate of the wall-attached inclined plate settler 3 and the wall surface of the cylindrical coagulation crystallizer 1 is 30°; an acute angle formed between the funnel type protective baffle for static settling 4 and the wall surface of the cylindrical coagulation crystallizer 1 is 70°.

Example 3

A method of removing and recycling nitrogen and phosphorus in wastewater comprises the following steps. 1) Starting stage of the reactor: after the mol ratio of $NH_4^+$—N and $PO_4^{3-}$—P is adjusted to 1.25:1, the wastewater comprising $NH_4^+$—N and $PO_4^{3-}$—P is introduced into the cylindrical coagulation crystallizer 1, after the sewage accounts for ⅚ of volume of the cylindrical coagulation crystallizer 1, a water-intake peristaltic pump is adjusted to ensure the water inflow is 1 L/h, meanwhile, the mechanical agitator 5 is opened, and the rotational speed of the mechanical agitator 5 is 60 rpm, then the magnesium source is added to the cylindrical coagulation crystallizer 1, and the concentration of the solution containing $Mg^{2+}$ and the flow rate of the feed pipe are adjusted, so that the mol ratio of $Mg^{2+}$ and $NH_4^+$ in the influent in the reactor is 1:1. The pH regulator solution feed pipe 9 is opened to ensure the pH value of the reaction liquid to remain 8.5. 2) Stabilization stage of the reactor: reflowing initial effluent in the reactor for secondary treatment, and introducing the effluent to a next processing unit for further treatment when the removal ratio of nitrogen and phosphorus in the effluent in the reactor reaches 95% or above and maintain stable. The MAP crystal discharge valve 10 at the bottom of the conical static settler 2 is opened at fixed time to discharge the MAP crystal obtained by coagulation crystallization.

Example 4

Following Example 3 except that air is introduced the cylindrical coagulation crystallizer 1 using an aeration pipe, and the volume ratio between the air intake quantity and the liquid intake quantity is 10:1.

The effect of treating high-concentration nitrogen and phosphorus wastewater is ideal. Under the same operating conditions, when the concentration of $NH_4^+$—N is higher than 500 mg/L, and the concentration of $PO_4^{3-}$—P is higher than 1000 mg/L, the removal and recovery ratio of nitrogen and phosphorus is 95% or above.

The pH regulator solution is HCl solution (acid liquor) or NaOH solution (alkaline liquor).

The magnesium source is $MgSO_4$, MgCl, MgO, or a mixture thereof.

In these examples, the product MAP or inert matters (such as stainless steel particles, zeolite particles, etc.) with a grain size of 0.1 mm-0.5 mm and a large specific surface area are directly added into the cylindrical coagulation crystallizer 1 as crystal nucleuses.

The effects of the invention are proven by adopting the following experiment.

The experiment is used for recycling the manually simulated high-concentration nitrogen and phosphorus wastewater by MAP crystallization. According to the operating method and steps of removing and recycling nitrogen and phosphorus by MAP crystallization, the manually stimulated wastewater is pumped into the cylindrical coagulation crystallizer 1 through a peristaltic pump and a water inlet pipe at a flow rate of 1 L/h. The properties of manually stimulated wastewater are as follows: c ($NH_4^+$—N)=670 mg/L, c ($PO_4^{3-}$—P)=2800 mg/L, and the initial pH=6-7. The mechanical agitator 5 is opened, the rotational speed is adjusted to 80 rpm, the magnesium source MgCl is added to the cylindrical coagulation crystallizer 1 through the magnesium source feed pipe 8, c (MgCl)=4200 mg/L, and the flow rate of the feed pipe is 1 L/h. The pH regulator solution feed pipe 9 is opened, and 10 mol/L of NaOH solution is pumped into the cylindrical coagulation crystallizer 1 to ensure the pH value of the reaction liquid to remain about 9. The effluent at the initial stage is reflowed for secondary treatment, about 40 min later, the removal and recovery ratio of nitrogen and phosphorus in the effluent reaches 95% or above and remains stable, and the reactor enters the stable operation stage. If a crystal is added to the cylindrical coagulation crystallizer 1 for inoculation under the same operating conditions, the recovery ratio of $NH_4^+$—N and $PO_4^{3-}$—P can be improved by about 2-3%.

Therefore, the experiment proves that the continuous flow reactor for treating high-concentration nitrogen and phosphorus wastewater can improve the recovery efficiency of $NH_4^+$—N and $PO_4^{3-}$—P in the high-concentration nitrogen and phosphorus wastewater.

The invention claimed is:

1. A method for treating wastewater comprising ammonium nitrogen ($NH_4^+$—N) and phosphate phosphorus ($PO_4^{3-}$—P) using a continuous flow reactor; the continuous flow reactor comprising a cylindrical coagulation crystallizer, a first inlet, a second inlet, a feed pipe, and an outlet; wherein the first inlet, the second inlet, the feed pipe, and the outlet are connected to the cylindrical coagulation crystallizer; the method comprising:
   a) adjusting a mol ratio of $NH_4^+$—N to $PO_4^{3-}$—P to 1.25-20:1, introducing the wastewater into the cylindrical coagulation crystallizer through the first inlet, adjusting an inflow through the first inlet to be 0.5-3 L/h, stirring the wastewater, adding a magnesium source solution comprising $Mg^{2+}$ to the cylindrical coagulation crystallizer through the second inlet, adjusting a mol ratio of $Mg^{2+}$ to $NH_4^+$—N in an influent comprising the wastewater flowing through the first inlet and the solution comprising $Mg^{2+}$ flowing through the second inlet to be 1-5:1, and opening the feed pipe for supplying a pH regulator solution to ensure the pH value of a reaction liquid comprising the wastewater and the solution comprising $Mg^{2+}$ to remain 7-10; and
   b) flowing an effluent resulting from mixing the wastewater and the solution comprising $Mg^{2+}$ out of the continuous flow reactor through the outlet and feeding it back to the continuous flow reactor through the first inlet until a removal ratio of ammonium nitrogen ($NH_4^+$—N) and phosphate phosphorus ($PO_4^{3-}$—P) remains stable.

2. The method of claim 1, wherein when a mechanical agitator is selected for stirring, a rotational speed of the mechanical agitator is between 30 and 150 rpm.

3. The method of claim 1, wherein when an aeration pipe is selected for stirring, a volume ratio between an air intake quantity and a liquid intake quantity is 5-20:1.

4. The method of claim 1, wherein when the concentration of $NH_4^+$—N is higher than 500 mg/L, and the concentration of $PO_4^{3-}$—P is higher than 1000 mg/L, the removal ratio of ammonium nitrogen ($NH_4^+$—N) and phosphate phosphorus ($PO_4^{3-}$—P) is 95% or above.

5. The method of claim 2, wherein when the concentration of $NH_4^+$—N is higher than 500 mg/L, and the concentration of $PO_4^{3-}$—P is higher than 1000 mg/L, the removal ratio of ammonium nitrogen ($NH_4^+$—N) and phosphate phosphorus ($PO_4^{3-}$—P) is 95% or above.

6. The method of claim 3, wherein when the concentration of $NH_4^+$—N is higher than 500 mg/L, and the concentration of $PO_4^{3-}$—P is higher than 1000 mg/L, the removal ratio of ammonium nitrogen ($NH_4^+$—N) and phosphate phosphorus ($PO_4^{3-}$—P) is 95% or above.

7. The method of claim 1, wherein the pH regulator solution is HCl solution or NaOH solution.

8. The method of claim 1, wherein the solution comprises $Mg^{2+}$ is $MgSO_4$, MgCl, MgO, or a mixture thereof.

9. A method for treating wastewater comprising ammonium nitrogen ($NH_4^+$—N) and phosphate phosphorus ($PO_4^{3-}$—P) using a continuous flow reactor; the continuous flow reactor comprising:
   a) a coagulation crystallizer confined by a cylindrical sidewall having an inner surface and an outer surface, the cylindrical sidewall comprising an upper part and a lower part; the coagulation crystallizer comprising a first upper end surface disposed at the top of the upper part, a first lower end surface disposed at the bottom of the lower part, a crystallizer opening surrounded by the upper part, and a side crystallizer opening disposed at the lower part; the side crystallizer opening having a rectangular mapping surface;
   b) a protective baffle having a funnel shape, the protective baffle comprising a second upper end surface disposed at the top of the protective baffle and a baffle opening disposed at the bottom of the protective baffle;
   c) a conical static settler, the conical static settler comprising a third upper end surface disposed at the top of the conical static settler and a precipitation outlet disposed at the bottom of the conical static settler;
   d) a wall-attached vessel confined by the outer surface and a conical sidewall, the wall-attached vessel comprising a bottom vessel opening disposed at the bottom of the wall-attached vessel and a top vessel opening disposed at the top of the wall-attached vessel;
   e) a water inlet pipe;
   f) a water outlet pipe;
   g) a first feed pipe for supplying a solution comprising $Mg^{2+}$;
   h) a second feed pipe for supplying a pH regulator solution;
   i) a stirring device; and
   j) a pH monitor;

wherein:
   the water inlet pipe, the first feed pipe, the second feed pipe, the stirring device, and the pH monitor, are respectively inserted in the coagulation crystallizer through the crystallizer opening;
   the water outlet pipe leads out from the wall-attached vessel through the vessel opening;
   the side crystallizer opening and the bottom vessel opening coincide;
   the first lower end surface is connected to the third upper end surface;
   the protective baffle is disposed within the coagulation crystallizer and above the conical static settler, and the second upper end surface is connected to the inner surface; and
   the water outlet pipe is connected to water inlet pipe;
the method comprising:
   a) adjusting a molar ratio of $NH_4^+$—N to $PO_4^{3-}$—P to be in a range of between 1.25 and 20:1;

b) introducing the wastewater through the water inlet pipe, and adjusting an inflow of the water inlet pipe to be in a range of between 0.5 and 3 L/h;
c) stirring the wastewater using the stirring device;
d) supplying the solution comprising $Mg^{2+}$ through the first feed pipe; and adjusting a molar ratio of $Mg^{2+}$ to $NH_4^+$—N in an influent comprising the wastewater flowing through the water inlet pipe and the solution comprising $Mg^{2+}$ flowing through the first feed pipe to be in a range of 1 to 5:1;
e) setting the pH value of the wastewater and the solution comprising $Mg^{2+}$ to be between 7 and 10 using the pH regulator solution and monitoring the pH using the pH monitor;
f) conducting a chemical reaction between $NH_4^+$—N, $PO_4^{3-}$—P, and $Mg^{2+}$ to produce magnesium ammonium phosphate (MAP) deposition in the coagulation crystallizer, thereby forming a coagulated substance;
g) transporting the coagulated substance from the coagulation crystallizer to the conical static settler and the wall-attached vessel through the protective baffle;
h) precipitating the MAP deposition out of the coagulated substance through the conical static settler and the wall-attached vessel to form a MAP precipitation and a fluid effluent;
i) flowing the fluid effluent through the water outlet pipe to the water inlet pipe until a removal ratio of ammonium nitrogen ($NH_4^+$—N) and phosphate phosphorus ($PO_4^{3-}$—P) remains stable; and
j) removing the MAP deposition out of the continuous flow reactor through the precipitation outlet.

10. A method for treating wastewater comprising ammonium nitrogen ($NH_4^+$—N) and phosphate phosphorus ($PO_4^{3-}$—P) using a continuous flow reactor, wherein a concentration of $NH_4^+$—N in the wastewater is higher than 500 mg/L and a concentration of $PO_4^{3-}$—P in the wastewater is higher than 1000 mg/L; the continuous flow reactor comprising a cylindrical coagulation crystallizer, a first inlet, a second inlet, a feed pipe, and an outlet; wherein the first inlet, the second inlet, the feed pipe, and the outlet are connected to the cylindrical coagulation crystallizer; the method comprising:
   a) adjusting a molar ratio of $NH_4^+$—N to $PO_4^{3-}$—P to be in a range of 1.25 to 20:1, introducing the wastewater into the cylindrical coagulation crystallizer through the first inlet, adjusting an inflow through the first inlet to be in a range of 0.5 to 3 L/h, stirring the wastewater, supplying a solution comprising $Mg^{2+}$ to the cylindrical coagulation crystallizer through a second inlet, adjusting a molar ratio of $Mg^{2+}$ to $NH_4^+$—N in an influent comprising the wastewater flowing through the first inlet and the solution comprising $Mg^{2+}$ flowing through the second inlet to be in a range of 1 to 5:1, and supplying a pH regulator solution through the feed pipe to ensure that the pH value of a reaction liquid comprising the wastewater and the solution comprising $Mg^{2+}$ remains in a range of 7 to 10; and
   b) flowing an effluent resulting from mixing the wastewater and the solution comprising $Mg^{2+}$ out of the continuous flow reactor through the outlet and feeding it back to the continuous flow reactor through the first inlet until a removal ratio of ammonium nitrogen ($NH_4^+$—N) and phosphate phosphorus ($PO_4^{3-}$—P) reaches 95% or above.

11. The method of claim 10, wherein when a mechanical agitator is selected for stirring, a rotational speed of the mechanical agitator is between 30 and 150 rpm.

12. The method of claim 10, wherein when an aeration pipe is selected for stirring, a volume ratio between an air intake quantity and a liquid intake quantity is 5-20:1.

13. The method of claim 10, wherein the pH regulator solution is HCl solution or NaOH solution.

14. The method of claim 10, wherein the solution comprising $Mg^{2+}$ is $MgSO_4$, MgCl, MgO, or a mixture thereof.

15. The method of claim 9, wherein when a mechanical agitator is selected as the stirring device, a rotational speed of the mechanical agitator is between 30 and 150 rpm.

16. The method of claim 9, wherein when an aeration pipe is selected as the stirring device, a volume ratio between an air intake quantity and a liquid intake quantity is between 5 and 20:1.

17. The method of claim 15, wherein when the concentration of $NH_4^+$—N is higher than 500 mg/L and the concentration of $PO_4^{3-}$—P is higher than 1000 mg/L, the removal ratio of ammonium nitrogen ($NH_4^+$—N) and phosphate phosphorus ($PO_4^{3-}$—P) is 95% or above.

18. The method of claim 16, wherein when the concentration of $NH_4^+$—N is higher than 500 mg/L and the concentration of $PO_4^{3-}$—P is higher than 1000 mg/L, the removal ratio of ammonium nitrogen ($NH_4^+$—N) and phosphate phosphorus ($PO_4^{3-}$—P) is 95% or above.

19. The method of claim 9, wherein the pH regulator solution is HCl solution or NaOH solution.

20. The method of claim 9, wherein the solution comprising $Mg^{2+}$ is $MgSO_4$, MgCl, MgO, or a mixture thereof.

* * * * *